US012605984B2

(12) United States Patent
Cho et al.

(10) Patent No.: US 12,605,984 B2
(45) Date of Patent: Apr. 21, 2026

(54) VEHICLE, METHOD, AND COMPUTER READABLE MEDIUM FOR PROVIDING SECURITY FUNCTION

(71) Applicants: Hyundai Motor Company, Seoul (KR); Kia Corporation, Seoul (KR); Korea University Research and Business Foundation, Seoul (KR)

(72) Inventors: A Ram Cho, Seoul (KR); Won Suk Choi, Seoul (KR); Se Young Lee, Seoul (KR); Dong Hoon Lee, Seoul (KR); Kyung Ho Joo, Seoul (KR); Yeon Seon Jeong, Chuncheon (KP); Gyung Eun Yun, Goyang (KR)

(73) Assignees: Hyundai Motor Company, Seoul (KR); Kia Corporation, Seoul (KR); Korea University Research and Business Foundation, Seoul (KR)

( * ) Notice: Subject to any disclaimer, the term of this patent is extended or adjusted under 35 U.S.C. 154(b) by 208 days.

(21) Appl. No.: 18/386,145

(22) Filed: Nov. 1, 2023

(65) Prior Publication Data

US 2024/0359532 A1 Oct. 31, 2024

(30) Foreign Application Priority Data

Apr. 26, 2023 (KR) ........................ 10-2023-0054858

(51) Int. Cl.
*B60H 1/00* (2006.01)
*B60R 25/24* (2013.01)

(52) U.S. Cl.
CPC ....... *B60H 1/00821* (2013.01); *B60R 25/245* (2013.01)

(58) Field of Classification Search
CPC ... B60H 1/00821; B60R 25/245; B60R 25/01; B60R 25/246; H04L 9/3297; H04L 2209/84
See application file for complete search history.

(56) References Cited

U.S. PATENT DOCUMENTS 7,649,936 B2 * 1/2010 Wagner .............. H04B 1/70755
375/240
11,184,153 B2 11/2021 Hammerschmidt et al.
(Continued)

FOREIGN PATENT DOCUMENTS

KR 10-2021-0020616 A 2/2021
KR 10-2021-0052161 A 5/2021
(Continued)

*Primary Examiner* — Aniss Chad
*Assistant Examiner* — Christine Nguyen Huynh
(74) *Attorney, Agent, or Firm* — Fox Rothschild LLP

(57) ABSTRACT

A vehicle is configured to provide a security function using an electronic key. A method includes receiving a vehicle control signal through an antenna device of the vehicle, extracting a scrambled timestamp sequence (STS) field in the vehicle control signal, dividing the extracted STS field into sub-fields, each of which has a predefined certain length, performing cross-correlation calculation of the divided sub-fields and sub-templates previously stored in storage of the vehicle, extracting times of arrival of the vehicle control signal from the results of performing the cross-correlation calculation, and determining the vehicle control signal as a normal signal when consistency of distribution locations of the times of arrival in the results of performing the cross-correlation calculation is greater than or equal to a predefined reference value and determining the vehicle control signal as an abnormal signal when the consistency is less than the predefined reference value.

16 Claims, 9 Drawing Sheets

10

(56)         References Cited

U.S. PATENT DOCUMENTS

| | | |
|---|---|---|
| 2020/0014526 A1 | 1/2020 | Hammerschmidt et al. |
| 2020/0217947 A1* | 7/2020 | Stitt ................... G07C 9/00309 |
| 2020/0351811 A1 | 11/2020 | Li et al. |
| 2022/0056749 A1* | 2/2022 | An .......................... E05F 15/77 |
| 2022/0174626 A1* | 6/2022 | Yang ................... H04W 56/005 |
| 2023/0180176 A1 | 6/2023 | Li et al. |

FOREIGN PATENT DOCUMENTS

| | | |
|---|---|---|
| KR | 10-2021-0135643 A | 11/2021 |
| KR | 102351586 B1 | 1/2022 |

* cited by examiner

START

COLLECT SIGNAL SAMPLE ~801

GENERATE SUB-FIELDS
AND SUB-TEMPLATES ~803

CALCULATE CIR VALUES ~805

MEASURE TOA VALUES ~807

809

$0_{acc} > \Gamma^{acc}$ ?

Yes → INVALIDATE
RECEIVE PACKET ~813

No

POST-PROCESSING ACCORDING
TO VERIFICATION PATH ~811

815

No    END?

Yes

END

VEHICLE, METHOD, AND COMPUTER READABLE MEDIUM FOR PROVIDING SECURITY FUNCTION

CROSS-REFERENCE TO RELATED APPLICATION

This application claims under 35 U.S.C. § 119 (a) the benefit of Korean Patent Application No. 10-2023-0054858, filed in the Korean Intellectual Property Office on Apr. 26, 2023, the entire contents of which are incorporated herein by reference.

BACKGROUND

(a) Technical Field

The present disclosure relates to supporting enhancement of a security function of a vehicle, more particularly, to the vehicle, a method, and a computer readable medium with the security function using an electronic key.

(b) Description of the Related Art

In general, a receiver in a wireless communication system may determine whether a signal is received by means of cross-correlation calculation between a previously known signal template and a receive signal. Particularly, because a preamble area essential for time synchronization is composed of a fixed value using a code defined in standard, the receiver may determine whether the signal is received by means of the preamble area and may perform time synchronization. As an example, the IEEE 802.15.4z standard is specified such that a high rate pulse repetition ultra-wide band (HRP UWB) device verifies a received scrambled timestamp sequence (STS) by means of cross-correlation.

Meanwhile, it is important to identify a direct path corresponding to a straight-line distance between a transmitter and the receiver to measure an accurate time of arrival of a packet in a non line-of-sight (NLoS) channel environment. To this end, a UWB reception device may separate a reflected path from the direct path using a back-search algorithm. A signal received through the reflected path may be stronger in intensity than a signal received through the direct path in a multi-path channel environment requiring the back-search algorithm. When the receiver measures a time of arrival on the basis of a maximum peak (or a reflected peak), an error may occur by a distance difference between the two paths. Thus, the receiver should analyze peaks within a certain range from the maximum peak and should identify a leading edge corresponding to the direct path. However, the back-search algorithm may have a structure where it is unable to verify integrity of a cross-correlation output. In other words, because the receiver always trusts the cross-correlation output, an attacker may inject a strong signal into an STS field and may pollute a channel impulse response (CIR) output. As a result, the attacker may generate a fake leading edge. As a result, because of measuring a time of arrival with respect to a time point faster than a normal time point, the receiver may make a mistake where a shortened distance value is calculated.

As an example, the attacker may transmit a preamble and a start of frame delimiter (SFD) field with weak intensity for the STS field and may inject a signal with strong intensity into the STS field, thus attempting to make a shortening attack on a real commercial product. in other words, the attacker may forge a distance between devices located at a distance of 10 m as 2 m by means of intensity adjustment for each field, which is described above. As described above, unlike an integrity verification scheme in units of bits, which is performed in an existing message authentication code (MAC), the cross-correlation-based STS verification may be performed by cross-correlation calculation between the received STS field (4,096 bits) and the local template (4,096 bits). Such an environment causes a security hole for allowing the attacker to successfully generate a fake leading edge, when achieving a cross-correlation output of a certain level or more although he or she does not know accurate information about 4,096 bits. This means a digital key-based smart key system using HRP UWB communication is able to trick a vehicle into recognizing a remote smart key in a remote distance as being nearby and provide an opportunity to steal the vehicle.

SUMMARY

An aspect of the present disclosure provides a method for providing a security function in a vehicle to reinforce an existing vulnerable STS verification scheme and provide detailed STS verification and a distance measurement function at the same time, a computer readable medium supporting the same, and a vehicle supporting the same.

Another aspect of the present disclosure provides a method for providing a security function in a vehicle to provide more improved security than before at the same time as minimizing deterioration in distance measurement performance due to the detailed STS verification, a computer readable medium supporting the same, and a vehicle supporting the same.

Another aspect of the present disclosure provides a method for providing a security function in a vehicle to provide easy technology implementation through only simple software modification in a digital signal processor (DSP) in a UWB chip currently distributed in the market, a computer readable medium supporting the same, and a vehicle supporting the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle for providing a security function may include a vehicle antenna device, a processor that processes a signal received through the vehicle antenna device, and a storage configured to store at least one instruction for operating the processor. The processor may be configured to receive a vehicle control signal through the vehicle antenna device, extract a scrambled timestamp sequence (STS) field in the vehicle control signal, divide the extracted STS field into sub-fields, each of which has a predefined certain length, perform cross-correlation calculation of the divided sub-fields and sub-templates previously stored in the storage, extract times of arrival of the vehicle control signal from the results of performing the cross-correlation calculation, and determine whether the received vehicle control signal is normal based on the times of arrival.

According to an embodiment, the processor may be configured to determine whether the vehicle control signal is normal based on consistency for distribution locations of the times of arrival in the results of performing the cross-correlation calculation.

According to an embodiment, the processor may be configured to divide a local template previously stored in the storage into a plurality of sub-templates in response to the lengths of the divided sub-fields.

According to an embodiment, the processor may be configured to determine a maximum peak on a frequency graph corresponding to the results of performing the cross-correlation calculation in conjunction with extracting the times of arrival, calculate peak candidates located within a certain length from the maximum peak, and calculate a furthest peak from the maximum peak among the calculated peak candidates as the time of arrival.

According to an embodiment, the processor may be configured to calculate an offset accumulation value for a difference between distribution locations of the times of arrival and determine the vehicle control signal as an attack signal corresponding to an abnormal signal when the offset accumulation value is greater than a predefined parameter value.

According to an embodiment, the processor may be configured to invalidate the received vehicle control signal, when the vehicle control signal is the abnormal signal.

According to an embodiment, the processor may be configured to transmit at least one of a time when the vehicle control signal is received, the number of times that the vehicle control signal is received, or a location where the vehicle control signal is received to a predefined device, when the vehicle control signal is the abnormal signal.

According to an embodiment, the processor may be configured to calculate an offset accumulation value for a difference between distribution locations of the times of arrival and determine the vehicle control signal as a normal signal when the accumulated offset less is less than or equal to a predefined parameter value.

According to an embodiment, the processor may be configured to unlock a door lock of the vehicle, turn on the vehicle, or turn on an air circulation device of the vehicle in response to the received vehicle control signal, when the vehicle control signal is the normal signal.

According to another aspect of the present disclosure, an operation method of a vehicle for providing a security function may include receiving, a processor, a vehicle control signal through an antenna device of the vehicle, extracting, by the processor, a scrambled timestamp sequence (STS) field in the vehicle control signal, dividing, by the processor, the extracted STS field into sub-fields, each of which has a predefined certain length, performing, by the processor, cross-correlation calculation of the divided sub-fields and sub-templates previously stored in storage of the vehicle, extracting, by the processor, times of arrival of the vehicle control signal from the results of performing the cross-correlation calculation, and determining, by the processor, whether the received vehicle control signal is normal based on the times of arrival.

According to an embodiment, the determining may include determining whether the vehicle control signal is normal based on consistency for distribution locations of the times of arrival in the results of performing the cross-correlation calculation.

According to an embodiment, the method may further include dividing a local template previously stored in the storage into a plurality of sub-templates in response to the lengths of the divided sub-fields.

According to an embodiment, the extracting of the times of arrival may include determining a maximum peak on a frequency graph corresponding to the results of performing the cross-correlation calculation, calculating peak candidates located within a certain length from the maximum peak, and calculating a furthest peak from the maximum peak among the calculated peak candidates as the time of arrival.

According to an embodiment, the determining may include calculating an offset accumulation value for a difference between distribution locations of the times of arrival and determining the vehicle control signal as an attack signal corresponding to an abnormal signal, when the offset accumulation value is greater than a predefined parameter value.

According to an embodiment, the method may further include invalidating the received vehicle control signal, when the vehicle control signal is the abnormal signal.

According to an embodiment, the method may further include transmitting at least one of a time when the vehicle control signal is received, the number of times that the vehicle control signal is received, or a location where the vehicle control signal is received to a predefined device, when the vehicle control signal is the abnormal signal.

According to an embodiment, the determining may include calculating an offset accumulation value for a difference between distribution locations of the times of arrival and determining the vehicle control signal as a normal signal, when the accumulated less is less than or equal to a predefined parameter value.

According to an embodiment, the method may further include controlling to unlock a door lock of the vehicle, turn on the vehicle, or turn on an air circulation device of the vehicle in response to the received vehicle control signal, when the vehicle control signal is the normal signal.

According to another aspect of the present disclosure, a non-transitory computer readable medium contains program instructions executed by a processor for providing a security function. The at least one instruction stored in the storage may cause the processor to receive a vehicle control signal through an antenna device of the vehicle, extract a scrambled timestamp sequence (STS) field in the vehicle control signal, divide the extracted STS field into sub-fields, each of which has a predefined certain length, perform cross-correlation calculation of the divided sub-fields and sub-templates previously stored in the storage, extract times of arrival of the vehicle control signal from the results of performing the cross-correlation calculation, and determine the vehicle control signal as a normal signal when consistency of distribution locations of the times of arrival in the results of performing the cross-correlation calculation is greater than or equal to a predefined reference value and determine the vehicle control signal as an abnormal signal when the consistency is less than the predefined reference value.

According to an embodiment, the at least one instruction may cause the processor to invalidate the received vehicle control signal, when the vehicle control signal is the abnormal signal, and control to unlock a door lock of the vehicle, turn on the vehicle, or turn on an air circulation device of the vehicle in response to the received vehicle control signal, when the vehicle control signal is the normal signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
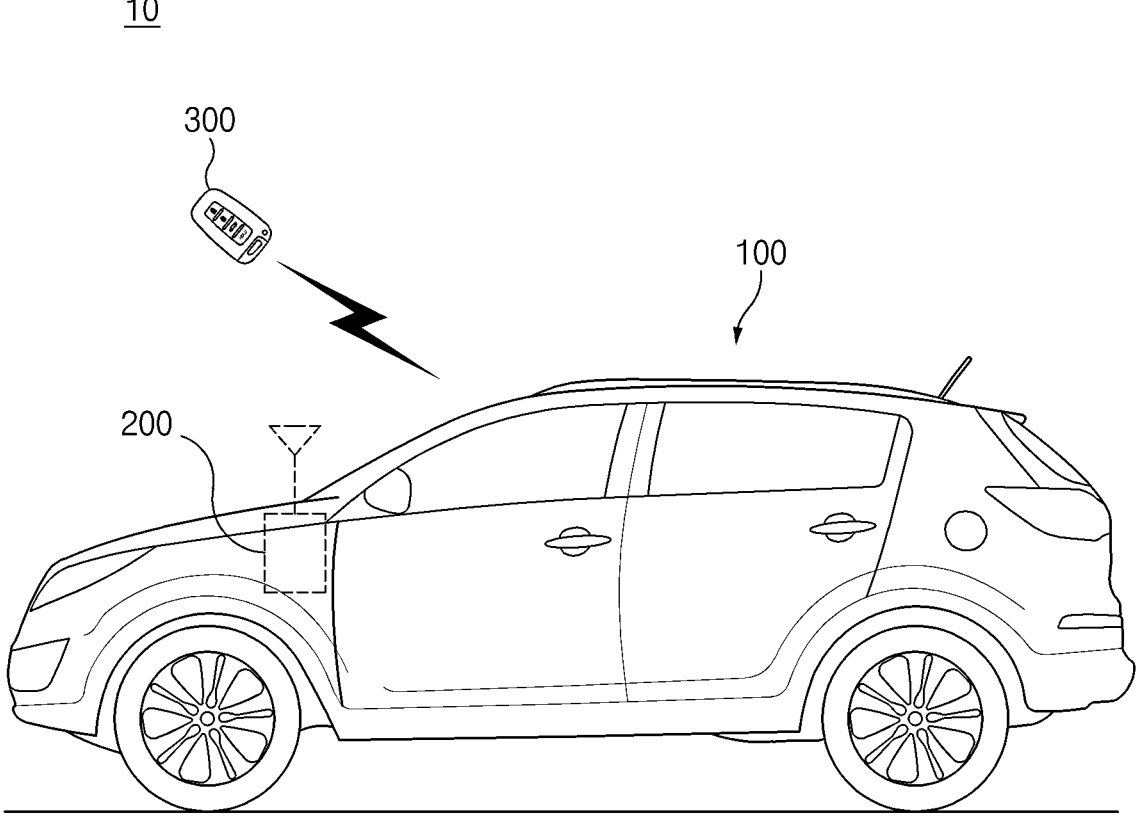
FIG. 1 is a drawing illustrating an example of a vehicle operation environment for supporting enhancement of a security function according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application. Hereinafter, embodiments of the present disclosure will be described in detail with reference to FIGS. 1 to 9.

Figure 2:
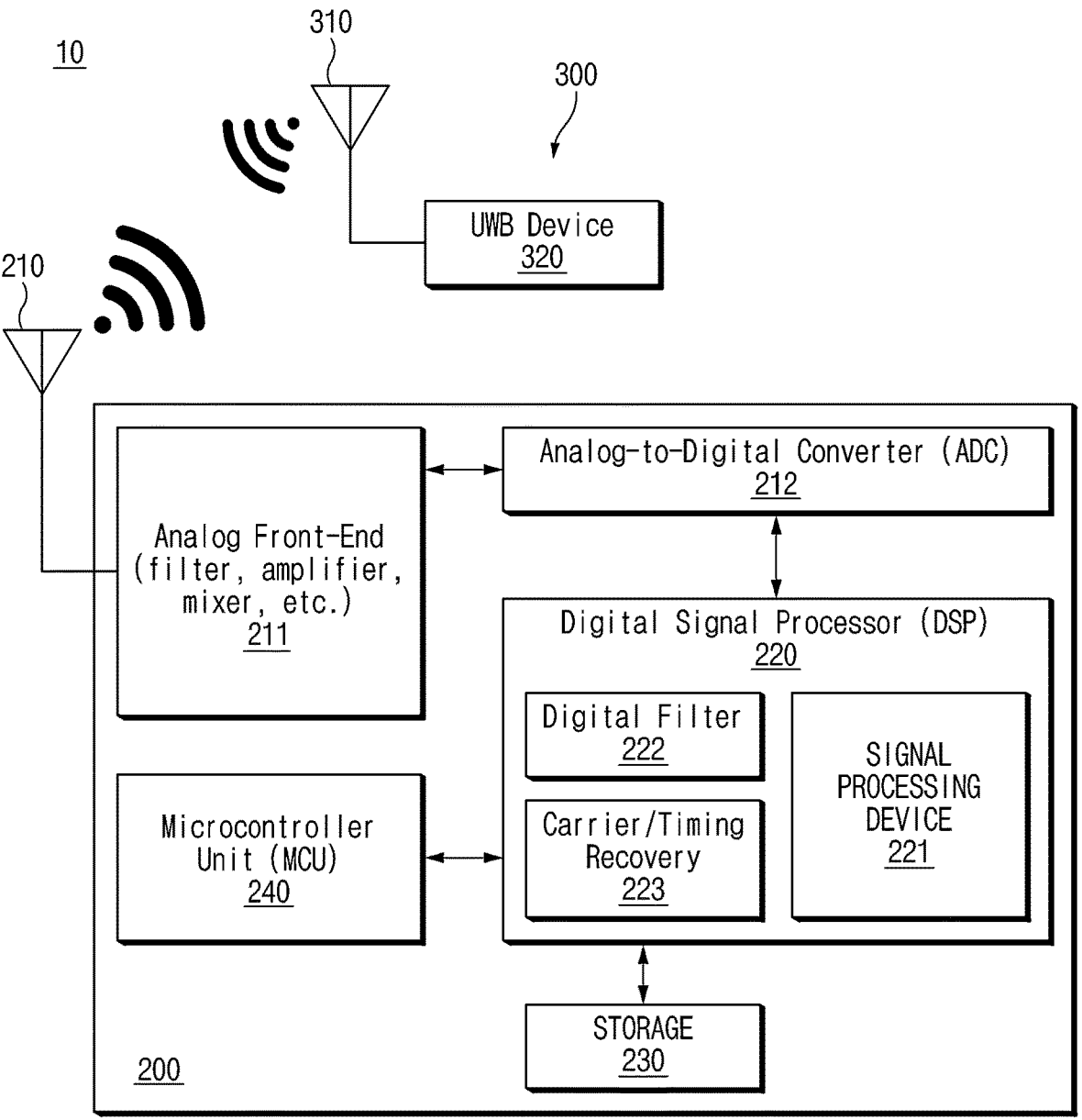
FIG. 2 is a drawing illustrating an example of respective components of a vehicle and a digital key device according to an embodiment of the present disclosure.

FIG. 1 is a drawing illustrating an example of a vehicle operation environment for supporting enhancement of a security function according to an embodiment of the present disclosure. FIG. 2 is a drawing illustrating an example of respective components of a vehicle and a digital key device according to an embodiment of the present disclosure.

Referring to FIGS. 1 and 2, a vehicle operation environment 10 according to an embodiment of the present disclosure may include a vehicle 100 and a digital key device 300.

The digital key device 300 may generate a vehicle control signal including a predefined digital key signal in conjunction with vehicle control depending on a user input and may transmit the generated vehicle control signal to a vehicle control device 200 in a wireless scheme. In this regard, the digital key device 300 may include a digital key antenna device 310 and a digital key body device 320. The digital key body device 320 may include a circuit capable of generating a vehicle control signal, a battery capable of supplying power to the circuit, and a case for covering the circuit and the battery. In addition, the digital key body device 320 may include an input device having at least one physical button or at least one touch key for generating a user input. When a vehicle control signal is generated according to manipulation of the input device provided in the digital key body device 320, the digital key body device 320 may transmit the vehicle control signal to the digital key antenna device 310 based on a predefined wireless communication scheme (e.g., an ultra wide band (UWB) scheme).

The vehicle 100 may include a vehicle body in which at least one of a driver or a passenger is able to ride, a plurality of wheels for movement of the vehicle body, a driving device capable of generating power for driving the plurality of wheels, at least one shaft and gears for delivering the power generated by the driving device to the plurality of wheels, a steering device for steering of the vehicle 100, and a brake system for adjusting a speed of the vehicle 100. Particularly, the vehicle 100 may include the vehicle control device 200 (or a computing device for vehicle, a computing system, a control device, a motor control unit, or a vehicle control unit) for supporting a security function (e.g., an enhanced security function) according to an embodiment of the present disclosure while supporting operation of the vehicle 100. The vehicle control device 200 may be disposed in the form of being embedded at one end of the vehicle 100. The vehicle control device 200 may include at least one sensor in conjunction with supporting operation of the vehicle 100, may collect sensing information according to driving of the vehicle 100, and may perform control necessary for the driving of the vehicle 100. As an example, when the vehicle is stopped and is then turned off, the vehicle control device 200 may maintain a communication circuit in a standby state for communication with the digital key device 300. When receiving the vehicle control signal transmitted from the digital key device 300, the vehicle control device 200 may identify whether the received vehicle control signal conforms to a predefined rule and may automatically control at least one of a lamp or horn device of the vehicle 100, a side mirror arrangement state of the vehicle 100, unlocking of a door lock of the vehicle 100, turning-on of the vehicle 100, inner return in the vehicle 100, or adjustment of temperature in the vehicle 100, when the received vehicle control signal conforms to the predefined rule. When the vehicle control signal received from the digital key device 300 does not conform to the predefined rule, the vehicle control device 200 may maintain a current state (e.g., a state where the vehicle 100 is turned off) without performing a separate additional operation. In addition, the vehicle control device 200 may control to collect information about a time when the vehicle control signal is received and the number of times that the vehicle control signal is received, a location where the vehicle control signal is received, or the like and store the collected information in storage 230, output the collected information on a display, or transmit the collected information to a previously specified user terminal.

To support the above-mentioned operations, the vehicle control device 200 may include a vehicle antenna device 210, an analog front-end 211, an analog-to-digital converter (ADC) 212, a digital signal processor (DSP) 220, a microcontroller unit (MCU) 240, and the storage 230. The remaining components except for the vehicle antenna device 210, the DSP 220 (or a processor), and the storage 230 among the components of the vehicle control device 200 may be omitted or may be arranged in another device of the vehicle 100.

The vehicle antenna device 210 may include a first antenna device provided to receive the vehicle control signal transmitted from the digital key device 300. Furthermore, the vehicle antenna device 210 may further include a second antenna device provided to transmit a wireless signal corresponding to a predefined message to a user terminal. When the message transmission function is removed from the user terminal, the second antenna device may be excluded from the vehicle antenna device 210.

The analog front-end 211 may include various communication circuit elements arranged between the vehicle antenna device 210 and the ADC 212. As an example, the analog front-end 211 may include a filter for filtering noise of the received signal, an amplifier for amplifying the filtered signal, a mixer for mixing the signal, or the like. Furthermore, the analog front-end 211 may include a matching element for impedance matching of the vehicle antenna device 210. Such an analog front-end 211 may deliver the vehicle control signal in an analog form, which is received by the vehicle antenna device 210, to the ADC 212.

The ADC 212 may be disposed between the analog front-end 211 and the DSP 220 to convert the analog signal delivered by the analog front-end 211 into a digital signal and deliver the digital signal to the DSP 220. For example, the ADC 212 may convert the vehicle control signal in the analog form into a vehicle control signal in a digital form. In addition, the ADC 212 may include a component (e.g., a digital to analog converter (DAC)) for converting a digital signal into an analog signal in response to a request of the DSP 220.

The DSP 220 may be disposed to exchange a signal with the ADC 212 and the MCU 240 and may process the vehicle control signal according to an embodiment of the present disclosure. In this regard, when receiving the vehicle control signal in the digital form from the ADC 212, the DSP 220 may process filtering of the received signal using a digital filter 222. In this process, the DSP 220 may perform signal recovery using a signal recovery device 223 in which there is a distorted or attenuated signal. For the recovered vehicle control signal, the DSP 220 may determine whether the vehicle control signal is a normal signal or an abnormal signal using a signal processing device 221. When it is determined that the vehicle control signal is the normal signal, the signal processing device 221 may deliver the vehicle control signal to the MCU 240. When it is determined that the vehicle control signal is the abnormal signal, the signal processing device 221 may discard the vehicle control signal. In addition, the signal processing device 221 may deliver a report for the situation where the abnormal signal is received to the MCU 240. Meanwhile, the signal processing device 221 is described as a detailed component of the DSP 220 in the above-mentioned description, but the DSP 220 may be replaced with the separate signal processing device 221 to serve as a signal processing device. The DSP 220 and the signal processing device 221 may be configured as at least one processor, thus being referred to as the processor.

The MCU 240 may control the vehicle 100 in response to the vehicle control signal delivered from the DSP 220. For example, when the delivered vehicle control signal is a signal for opening a door, the MCU 240 may control the vehicle 100 to unlock a door lock of the vehicle 100. Furthermore, when the vehicle control signal is a signal for releasing a back door of the vehicle 100 and requesting to open the back door, the MCU 240 may control to release and open the back door depending to the vehicle control signal. Alternatively, when the vehicle control signal is a signal for requesting a location notification, the MCU 240 may control to turn off a lamp of the vehicle 100 or output a specified horn. In addition, the MCU 240 may control to perform a predefined control function of the vehicle 100 depending on a type of the delivered vehicle control signal.

The storage 230 may store various pieces of data, algorithms, or programs necessary for operation of the DSP 220. As an example, the storage 230 may store a reference signal for identifying whether the vehicle control signal is normal or abnormal and may deliver the reference signal to the DSP 220 in response to the request of the DSP 220. As an example, the storage 230 may store a local template as the reference signal. Furthermore, the storage 230 may temporarily or semi-permanently store a signal sample including at least a portion of the vehicle control signal received through the vehicle antenna device 210.

Figure 3:
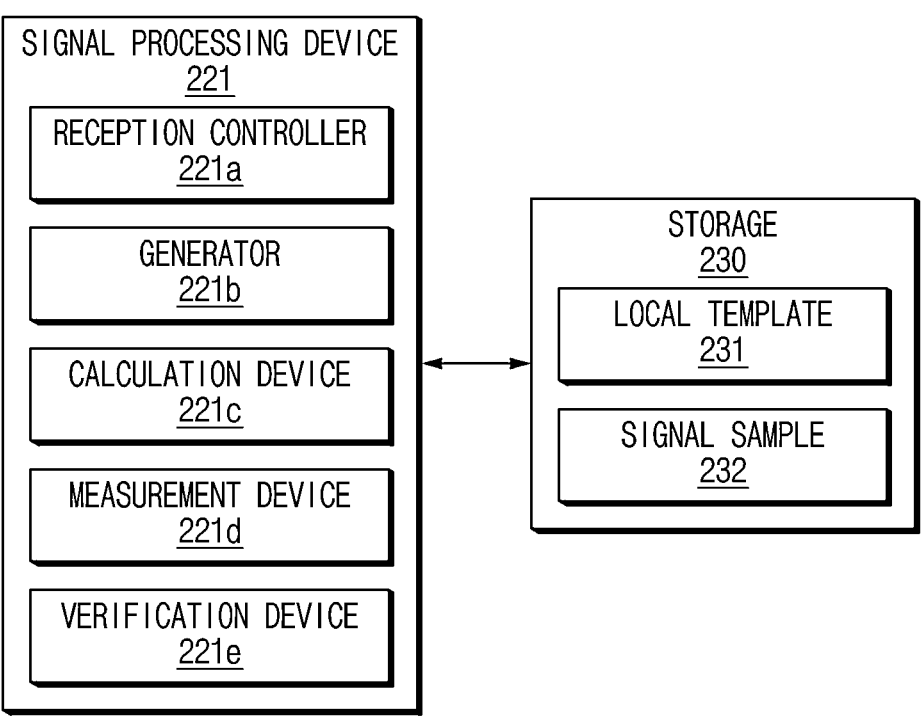
FIG. 3 is a drawing illustrating an example of detailed structures of some of components of a vehicle control device according to an embodiment of the present disclosure.
Figure 4:
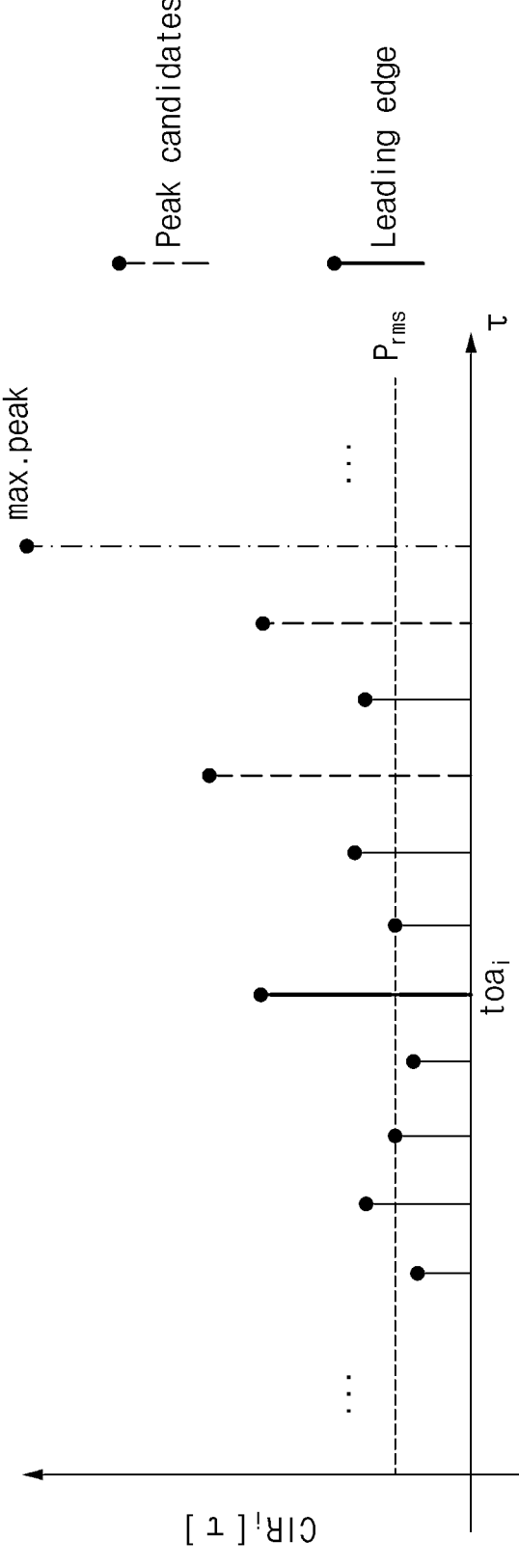
FIG. 4 is a drawing for description associated with operation of a measurement device in STS signal processing according to an embodiment of the present disclosure.

FIG. 3 is a drawing illustrating an example of detailed structures of some of components of a vehicle control device according to an embodiment of the present disclosure. FIG. 4 is a drawing for description associated with operation of a measurement device in STS signal processing according to an embodiment of the present disclosure.

Referring to FIG. 3, at least some of components of a vehicle control device 200 are illustrated. For example, the vehicle control device 200 may at least include a signal processing device 221 (or at least one processor) and storage 230. The storage 230 may store a signal sample 232. The at least some of the components of the vehicle control device 200, which is described above, may be implemented as a UWB device. Herein, a packet structure of a UWB signal received by the signal processing device 221 may include a preamble area, a start of frame delimiter (SFD) area, a physical layer header (PHR) area, and a payload area. The UWB device may include a DSP 220. The DSP 220 may include the signal processing device 221 capable of verifying a received STS field, measuring a time of arrival, (ToA or toa), and verifying effectiveness. The signal processing device 221 may divide the received STS field and a local template into several sub-fields and sub-templates, may measure a ToA of a signal by means of individual cross-correlation calculation and back-search, and may perform consistency verification of several ToA measurement values to verify effectiveness of the received STS field. To this end, the signal processing device 221 may include, for example, a reception controller 221a, a generator 221b, a calculation device 221c, a measurement device 221d, and a verification device 221e.

The reception controller 221a may control a state where it is able to receive a vehicle control signal by means of a vehicle antenna device 210. For example, the reception controller 221a may control to power off a device or circuits associated with receiving the vehicle control signal when the vehicle 100 is turned on and may control a power supply state to receive the vehicle control signal through the vehicle antenna device 210 when the vehicle 100 is turned off. When the vehicle control signal is received through the vehicle antenna device 210, the reception controller 221a may control to store the received vehicle control signal as the signal sample 232 in the storage 230.

The generator 221b may obtain the signal sample 232 stored in the storage 230 and a local template 231 previously stored in the storage 230 and may divide the obtained signal sample 232 and the obtained local template 231 into predefined lengths to generate a plurality of sub-fields and a plurality of sub-templates. The generator 221b may deliver the plurality of generated sub-fields and the plurality of generated sub-templates to the calculation device 221c.

The calculation device 221c may receive an individual sub-field $s_i[\tau]$ and an individual sub-template $$(g_{loc}^i)$$

as inputs for each of the plurality of sub-fields and the plurality of sub-templates. The calculation device 221c may perform cross-correlation calculation defined in Equation 1 below for the received individual sub-field and the received individual sub-template to calculate $CIR_i[\tau]$.

$$CIR_i[\tau] = s_i[c_{correlation}]g_{loc}^i[\tau] = \sum_{n=0}^{|g_{loc}^i|} \overline{g_{loc}^i[n]} \cdot s[n + \tau] \qquad \text{[Equation 1]}$$

In the equation for calculating a channel impulse response (CIR), [$c_{correlation}$] may refer to the cross-correlation calculation, [$\tau$] may refer to time, and n may be the natural number including "0".

The measurement device 221d may calculate a time or arrival $toa_i$ of a signal using the individual $CIR_i[\tau]$ calculated by the calculation device 221c. The measurement of the time or arrival $toa_i$ of the signal may be performed using an existing back-search algorithm. In detail, in FIG. 4, a leading edge may be used to calculate a peak candidate in a window by a length W from a maximum peak and calculate a location of a peak having the smallest index (i.e., furthest from the maximum peak) among the calculated peak candidates as $toa_i$. $P_{ms}$ may be a root-mean-square value of peak values.

Parameters used in the back-search algorithm may be generally a back-search window W, a maximum peak to earlier peak ratio (MPEP), and a peak to average power ratio (PAPR). A set P of peaks within a range W from the maximum peak may be represented as Equation 2 below.

$$P = \{(\tau_0, p_0), (\tau_1, p_1), \dots, (\tau_j, p_j), \dots, (\tau_N, p_N)\} \qquad \text{[Equation 2]}$$

$\tau_i$ may refer to the index of the i th peak, and $p_i$ may indicate the power of the peak. The back-search algorithm finds a peak which is greater than an average power $P_{rms}$ of $CIR_i$ by the PAPR while being less than the MPEP in power difference with the maximum peak among the sets of the peaks. When this is indicated as an equation, it may be represented as Equation 3 below. The measurement device 221d may measure $toa_i$ with respect to an index $\tau_i$ of the peak.

$$toa_i = \tau_{le} = \min_{\tau_j} \left( \frac{P_{max}}{p_j} < MPEP \wedge \frac{p_j}{p_{rms}} > PAPR \right) \qquad \text{[Equation 3]}$$

There may be maximum peaks at a certain location of cross-correlation between the sub-field and the sub-template in a situation where the vehicle control signal is normal. In the abnormal situation, an individual leading edge may be irregularly present in the cross-correlation between the sub-field and the sub-template or may deviate from a normal situation to be present at an irregular location.

The verification device 221e may analyze pieces of toa information (or times of arrival of the signal) calculated by the measurement device 221d and may verify whether the received STS field is transmitted from a legal device (i.e., integrity). It may be possible for the verification to be performed through consistency verification. Representatively, consistency may be verified through offset accumulation. The verification performed by the verification device 221e may use an individual toa and predefined detection parameters $\mu$, $\Gamma^{acc}$, and the like. When the offset accumulation value is greater than the predefined detection parameter $\Gamma^{acc}$, the verification device 221e may detect it as an attack. When the offset accumulation value is not greater than the predefined detection parameter, the verification device 221e may determine the received vehicle control signal as a legal STS. The offset accumulation value may be calculated by Equation 4 below.

$$O_{acc} = \sum_{i=0}^{N_t} \tau_i - \mu \qquad \text{[Equation 4]}$$

In Equation 4 above, $O_{acc}$ may indicate the offset accumulation and $N_t$ may indicate the number of sub-templates (or sub-fields). When it is detected as the attack, the received STS field and the frame may be validated. When the verification passes, the reception controller 221a may calculate an average value $\mu_r$ of $\tau_i$ as a time of an arrival of the frame and may use it for distance measurement.

As described above, the verification device 221e may be a part for verifying consistency of measurement values of the individual toa. The consistency verification may be used to digitalize consistency using various statistical indexes and a machine learning technique. As an example, the verification device 221e may measure variance of measurement values. Thus, because it is possible for the verification device 221e to be implemented in various forms, the verification device 221e may be expressed in the form of a function $f(\cdot)$.

As described above, the signal processing device 221 according to an embodiment of the present disclosure may prevent a distance shortening (or forgery) attack for HRP UWB loaded into a next-generation smart key system (or digital key standard) and may be used in various applications (or indoor robots, unmanned vehicles, or the like) which use the HRP UWB (or positioning information).

Figure 5:
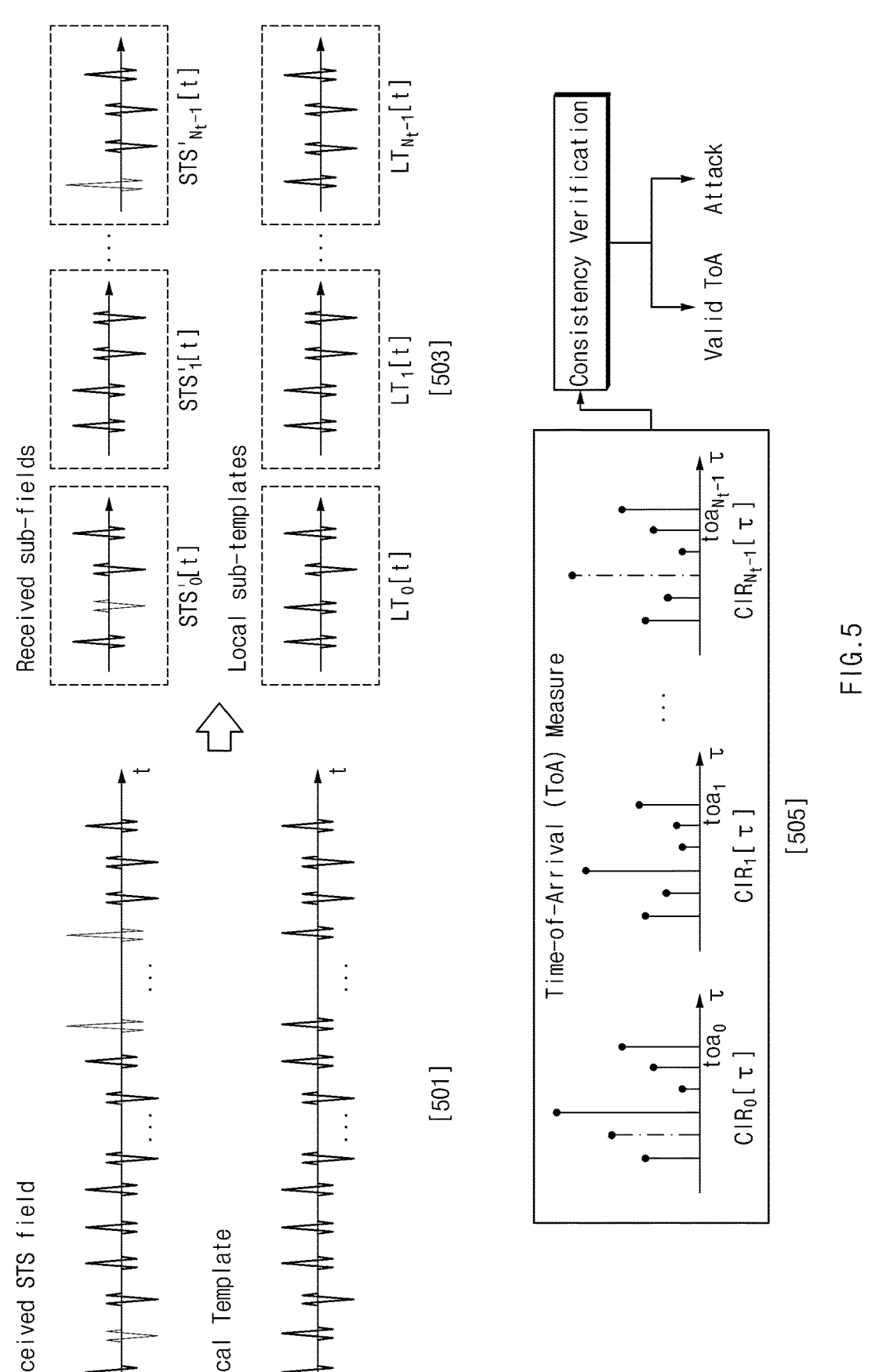
FIG. 5 is a drawing illustrating an example of signals associated with signal processing of a vehicle control device according to an embodiment of the present disclosure.
Figure 6:
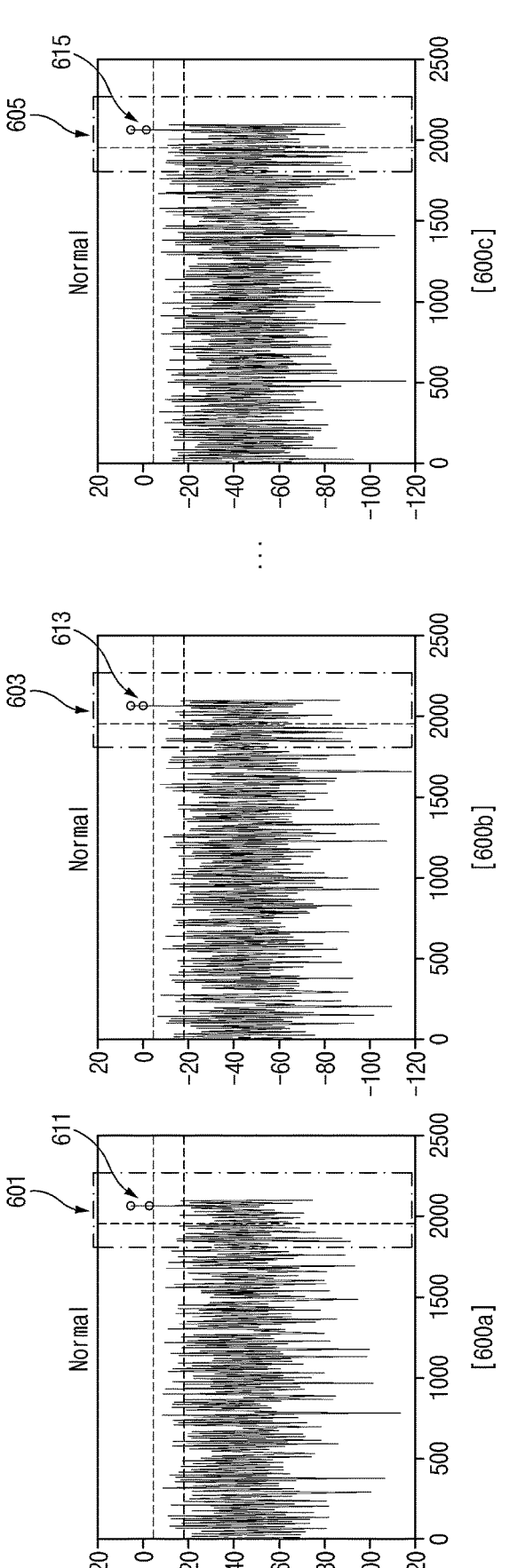
FIG. 6 is a drawing illustrating a leading edge in a normal state according to an embodiment of the present disclosure.
Figure 7:
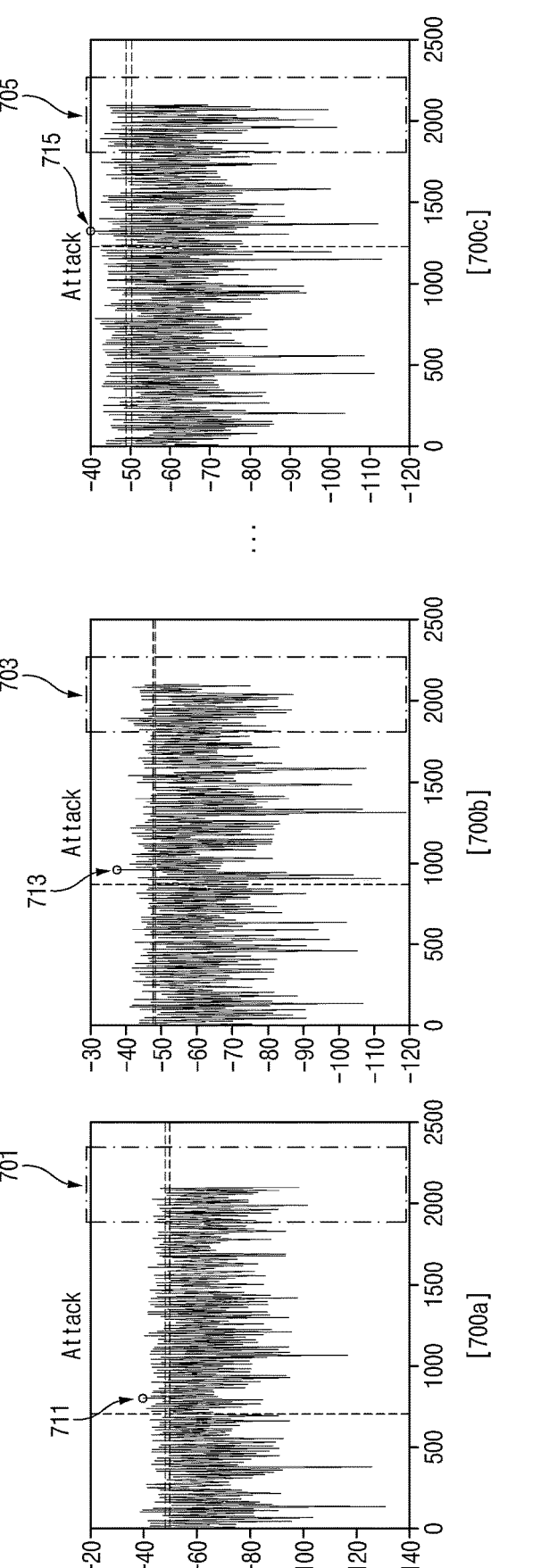
FIG. 7 is a drawing illustrating a leading edge in an abnormal state according to an embodiment of the present disclosure.

FIG. 5 is a drawing illustrating an example of signals associated with signal processing of a vehicle control device according to an embodiment of the present disclosure. FIG. 6 is a drawing illustrating a leading edge in a normal state according to an embodiment of the present disclosure. FIG. 7 is a drawing illustrating a leading edge in an abnormal state according to an embodiment of the present disclosure.

First of all, referring to FIG. 5, when a vehicle control device 200 receives a vehicle control signal through a vehicle antenna device 210, a signal processing device 221 may store the received vehicle control signal (or a received STS field) as a signal sample 232 in storage 230. The received STS field is one example, which may be in a form such as state 501 in FIG. 5. Meanwhile, a local template stored in the storage 230 may be in a form such as state 501 to be compared with the received STS field.

A generator 221b of the signal processing device 221 may divide the above-mentioned received STS field into predefined certain lengths (e.g., a length capable of dividing the received STS field into a plurality of sub-fields, which a length including at least one or more leading edges) to be divided into the plurality of sub-fields $STS_0[t]$, $STS_1[t], \ldots,$ and STS'N1−1[t] in state 503. Furthermore, the generator 221b may divide the above-mentioned local templates into predefined certain lengths to be divided into a plurality of local sub-templates $LT_0[t]$, $LT_1[t], \ldots,$ and LTN1−1[t] in state 503. As an example, the respective sub-templates and the respective sub-fields may be the same in length as each other. As another example, the generator 221b may change a length of the divided sub-fields depending on the length of the received STS field. For example, the generator 221b may more lengthen the length of the divided sub-fields than a predefined reference length, when the length of the received STS field is longer than the predefined reference length, and may more shorten the length of the divided sub-fields than the predefined reference length, when the length of the received STS field is shorter than the predefined reference length. In response, the generator 221b may change the length for dividing the local template in response to the length of the received STS field. For example, the generator 221b may more lengthen the length of the divided sub-fields than the predefined reference length, when the length of the received STS field is longer than the predefined reference length, and may more shorten the length of the divided sub-templates than the predefined reference length, when the length of the received STS field is shorter than the predefined reference length. As another example, in the process of dividing the local template into sub-templates, the length of the sub-templates may be fixed. In this case, the generator 221b may make a number where the received STS field is divided be identical to the number of sub-templates. Thus, when the length of the received STS field is changed, sub-templates divided by the generator 221b may be the same in number and may vary in length.

A calculation device 221c may calculate CIR values. For example, the calculation device 221c may perform cross-correlation calculation of each of sub-fields obtained by dividing the received STS field corresponding to a signal sample 232 into the predefined certain lengths and each of sub-templates obtained by dividing a local template previously stored in the storage 230 into the predefined certain lengths.

A measurement device 221d may calculate toa values for the values obtained as the calculation device 221c performs the cross-correlation calculation. The measurement device 221d may apply a back-search algorithm to find a peak which is greater than an average power $P_{rms}$ of $CIR_i$ by a PAPR while being less than an MPEP in power difference with a maximum peak among the sets of the peaks (where i is 0 to $N_1$−1).

A verification device 221e may perform consistency verification and may identify whether the currently received STS field is a normal state signal (or a valid ToA) or an abnormal state signal (or an attack). For example, the verification device 221e may determine the received STS field as the normal state signal, when the distribution locations of the toa values detected in state 505 indicate consistency which is greater than or equal to a predefined certain rate, and may determine the received STS field as the abnormal state signal, when the distribution locations of the toa values detected in state 505 indicates consistency which is less than the predefined certain rate (or irregularity where more than a certain percentage of all the toa values has different distribution locations).

Referring to FIG. 6, as shown in frequency graphs 600a to 600c corresponding to cross-correlations between sub-fields and sub-templates, it may be seen that leading edges 611, 613, and 615 corresponding to a maximum peak are located within specified normal ranges 601, 603, and 605 in the normal state signal. For example, the leading edges 611, 613, and 615 may be consistently detected in rear areas of the frequency graphs indicating the cross-correlations. Meanwhile, the frequency graphs 600a to 600c may correspond to values obtained by performing the cross-correlation calculation of each of the plurality of sub-fields obtained by dividing the signal sample 232 (or the received STS field) illustratively described above in FIG. 5 and each of the plurality of sub-templates obtained by dividing the local template 231 previously stored in the storage 230. Particularly, the frequency graphs 600a to 600c may correspond to dividing an STS field extracted from a vehicle control signal transmitted from a digital key device 300 of a normal user, which is previously registered in a vehicle 100, in FIG. 6 into sub-fields of predefined certain lengths.

Referring to FIG. 7, as shown in frequency graphs 700*a* to 700*c* corresponding to cross-correlations between sub-fields and sub-templates, it may be seen that leading edges 711, 713, and 715 corresponding to a maximum peak are located at points out of specified normal ranges 701, 703, and 705 in the abnormal state signal. For example, the leading edges 711, 713, and 715 may be irregularly detected in front or middle areas of the frequency graphs indicating the cross-correlations. As described above, it may be identified that the leading edges 711, 713, and 715 are not detected within the normal ranges 701, 703, and 705 and are irregularly detected from other portions in the abnormal state signal. As an example, the frequency graphs 700*a* to 700*c* may correspond to that the vehicle 100 receives a vehicle control signal transmitted from a digital key device of an abnormal user which is not previously registered in the vehicle 100 and divides an STS field extracted from the received vehicle control signal into sub-fields of predefined certain lengths.

Figure 8:
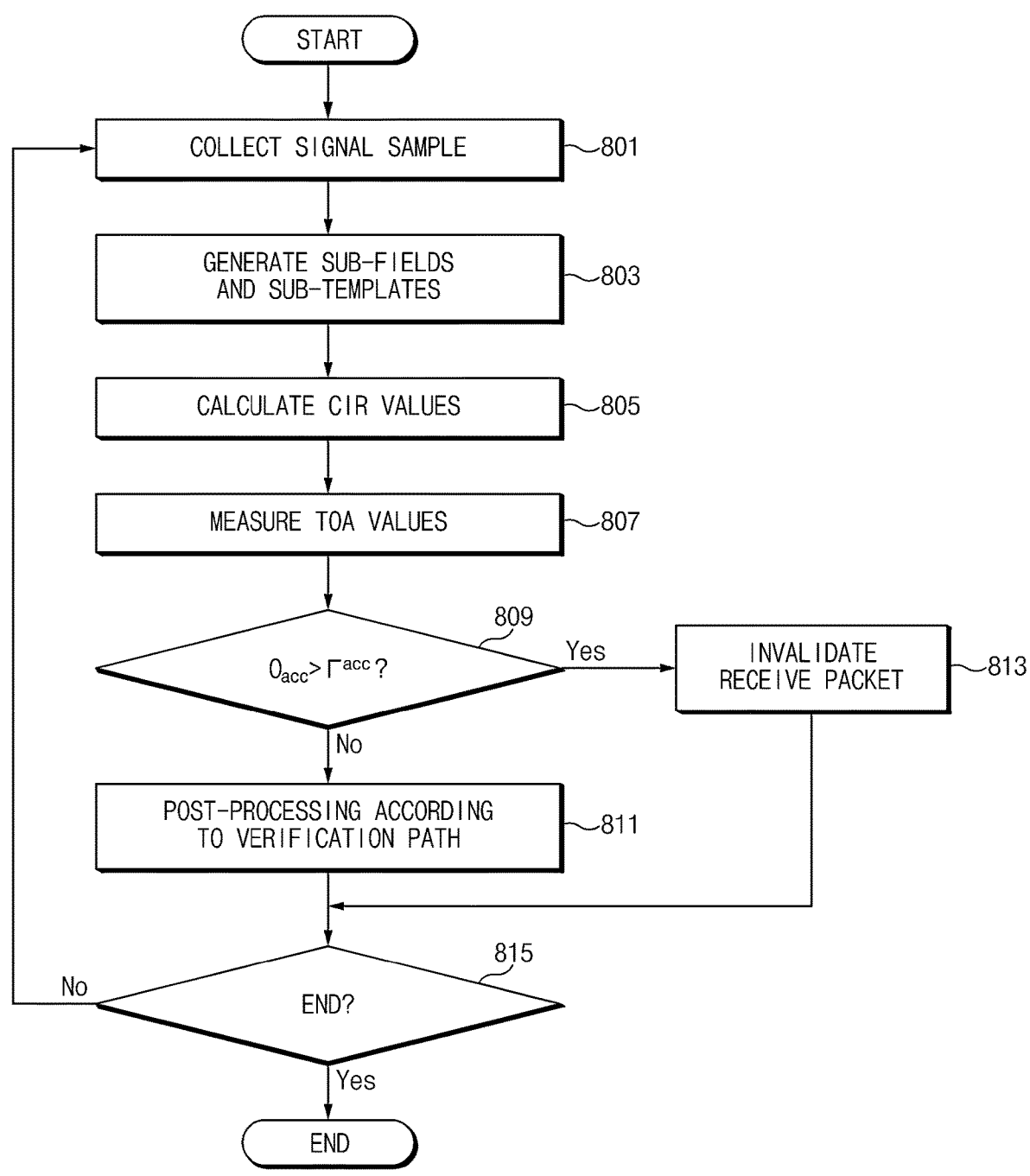
FIG. 8 is a drawing illustrating an example of a method for providing a security function in a vehicle according to an embodiment of the present disclosure.

FIG. 8 is a drawing illustrating an example of a method for providing a security function in a vehicle according to an embodiment of the present disclosure.

Referring to FIG. 8, in conjunction with the method for providing the security function according to an embodiment of the present disclosure, in operation 801, a processor (or a signal processing device 221) of a vehicle 100 may collect a signal sample. In this regard, the processor of the vehicle 100 may have a signal reception standby state in which a signal is able to be received from a digital key device 300. When receiving a vehicle control signal transmitted from the digital key device 300, the processor of the vehicle 100 may extract an STS field in the received vehicle control signal as a signal sample and may temporary store the STS field in storage 230.

In operation 803, the processor of the vehicle 100 may generate sub-fields and sub-templates. For example, the processor of the vehicle 100 may divide the STS field stored in the storage 230 into predefined certain lengths (or lengths shorter than the length of the STS field) to generate a plurality of sub-fields. Furthermore, the processor of the vehicle 100 may divide the local template previously stored in the storage 230 depending on at least one of the number or a length of the plurality of divided sub-fields to generate a plurality of sub-templates.

In operation 805, the processor of the vehicle 100 may calculate CIR values. For example, the processor of the vehicle 100 may perform cross-correlation calculation of the respective sub-fields and the respective sub-templates to calculate respective CIR values.

In operation 807, the processor of the vehicle 100 measure ToA values. In detail, the processor of the vehicle 100 may measure a point in the furthest distance from a maximum peak point while greater than or equal to an average power value with respect to the maximum peak point indicating the highest power value among the calculated CIR values as a ToA value for the respective sub-fields.

In operation 809, the processor of the vehicle 100 may identify whether an offset accumulation value $O_{acc}$ (or a consistency value of an accumulation ToA) associated with consistency of the ToA values of the respective sub-fields is greater than or equal to a predefined reference value $\Gamma^{acc}$ (or a detection parameter value). When the offset accumulation value $O_{acc}$ is not greater than the predefined detection parameter $\Gamma^{acc}$ (or is less than or equal to the detection parameter value or when consistency of the distribution of ToA values is greater than or equal to the predefined reference value), the processor of the vehicle 100 may determine that a normal state signal is received. As an example, when 9 ToA values among 10 ToA values are at a first location and when the remaining 1 ToA value is at a location different from the first location, the processor of the vehicle 100 may determine that a normal signal is received. A rate (e.g., 10%) of a criterion for determining the normal signal may be corrected. When it is determined that the normal state signal is received, in operation 811, the processor of the vehicle 100 may perform processing through a verification path and may perform post-processing according to the verification path. For example, when the vehicle control signal is the normal signal, the processor of the vehicle 100 may be configured to unlock a door lock of the vehicle 100, open a back door of the vehicle 100, turn on the vehicle 100, or turn on an air circulation device of the vehicle 100, in response to the received vehicle control signal. Alternatively, the processor of the vehicle 100 may be configured to activate a predefined vehicle-related function. In addition, the processor of the vehicle 100 may be configured to determine a distance from the digital key device 300 which transmits the vehicle control signal based on the times of arrival. Furthermore, the processor of the vehicle 100 may transmit the calculated distance value to a specified device (e.g., a user terminal). Herein, the operation of determining the distance may be performed when the vehicle control signal is determined as the normal signal.

When the offset accumulation value $O_{acc}$ is greater than the predefined detection parameter $\Gamma^{acc}$ (or when consistency of the distribution of ToA values is less than the predefined reference value or when ToA values distributed at a location different from the first location of ToA values which are greater than or equal to a specified rate among all ToA values in the sub-fields are greater than or equal to the reference value), the processor of the vehicle 100 may determine it as an attack. As an example, when 7 ToA values among the 10 ToA values are at the first location and when the remaining 3 ToA values are at a location different from the first location, the processor of the vehicle 100 may determine it as an attack. A rate (e.g., 30%) of a criterion for determining the attack signal (or a criterion for determining the abnormal signal) may be corrected. When it is determined that the abnormal signal is received or the attack signal is received, in operation 813, the processor of the vehicle 100 may invalidate a receive packet. In addition, when the vehicle control signal is the abnormal signal, the processor of the vehicle 100 may transmit at least one of a time when the vehicle control signal is received, the number of times that the vehicle control signal is received, and a location where the vehicle control signal is received to a predefined device (e.g., a user terminal capable of being connected through a display device disposed in the vehicle 100 or a communication circuit of the vehicle 100).

In operation 815, the processor of the vehicle 100 may identify whether an event associated with ending the verification is received. For example, when the vehicle control signal is not received during a predefined certain time, the processor of the vehicle 100 may switch to a standby state, may maintain only power where it is able to receive the vehicle control signal, and may transition to a sleep state. When the vehicle control signal is received again within a specified time, the processor of the vehicle 100 may branch to operation 801 to perform the operation again from operation 801.

As described above, the method for providing the security function in the vehicle according to an embodiment of the present disclosure may assist in performing distance measurement at the same time as verifying an STS field based on the result of performing cross-correlation calculation between several sub-fields and sub-templates divided into short lengths, rather than single verification for the entire STS field, and verifying consistence of toa values measured from the result of performing the cross-correlation between the sub-fields and the sub-templates in the verified process by generating the sub-templates and the sub-fields. In other words, as one feature of the present disclosure, the method for providing the security function in the vehicle according to an embodiment of the present disclosure may assist in verifying integrity of the STS field at the same time at a time point when toa is measured, which is a time of arrival of the frame.

Figure 9:
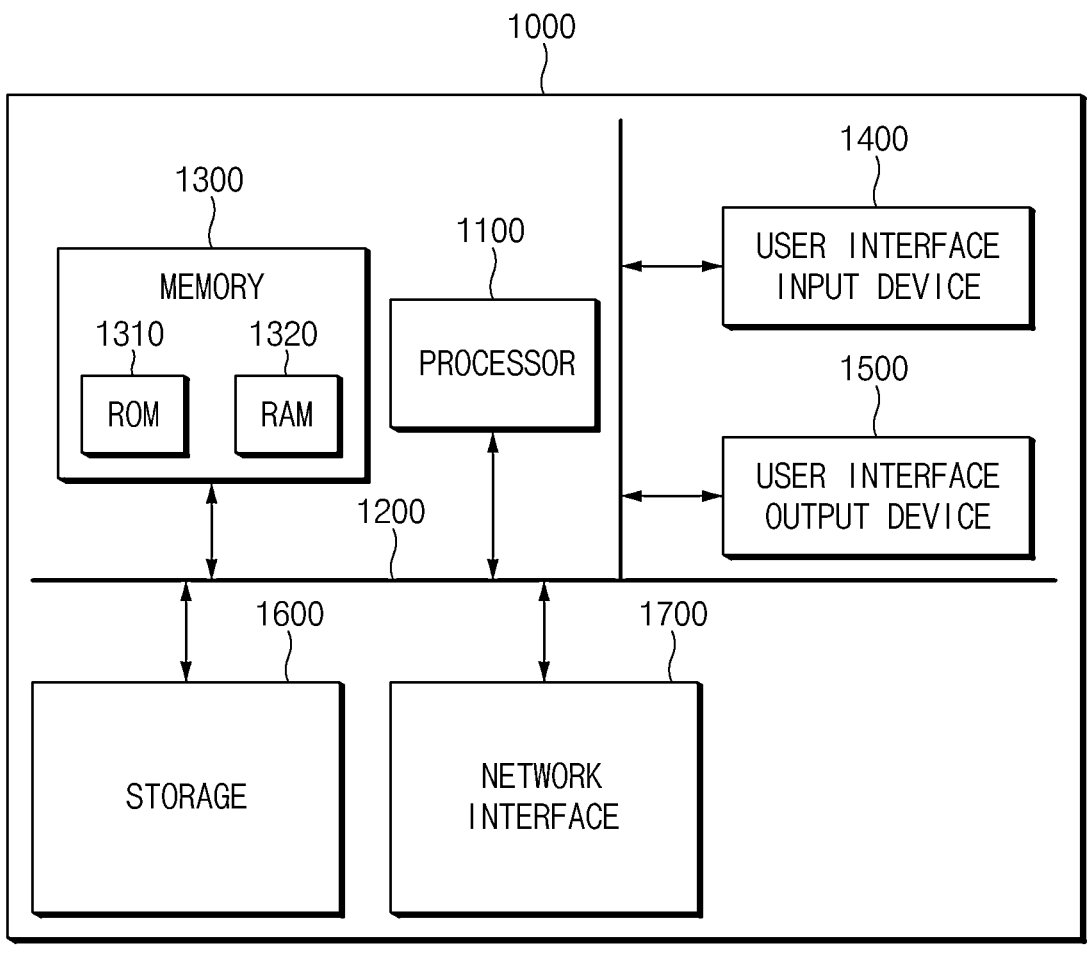
FIG. 9 is a block diagram illustrating a computing system according to an embodiment of the present disclosure.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200. The computing system 1000 described with reference to FIG. 9 may be a system, at least a part of which is applicable to the vehicle 100 described above with reference to FIGS. 1 to 3 and may be a computing system capable of performing the method for providing the security function in the vehicle, which is described above with reference to FIG. 8.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

An embodiment of the present disclosure may provide security reinforcement of a next-generation smart key system.

Furthermore, an embodiment of the present disclosure may prevent a distance shortening (or forgery) attack for HRP UWP loaded into the next-generation smart key system (or digital key standard).

Furthermore, an embodiment of the present disclosure may fundamentally block a possibility of attacking the next-generation smart key system and may provide a possibility of being used in various applications (or an indoor robot, an unmanned vehicle, and the like) which use the HRP UWB (or positioning information).

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle comprising:
a vehicle antenna device;
a processor configured to process a signal received through the vehicle antenna device; and
a storage configured to store at least one instruction for operating the processor,
wherein the processor is configured to:
receive a vehicle control signal through the vehicle antenna device;
extract a scrambled timestamp sequence (STS) field in the vehicle control signal;
divide the extracted STS field into sub-fields, each of which has a predefined certain length;
divide a local template previously stored in the storage into a plurality of sub-templates in response to the lengths of the divided sub-fields;
perform a cross-correlation calculation of the sub-fields divided from the extracted STS field and the plurality of sub-templates divided from the local template;
extract times of arrival of the vehicle control signal from the results of performing the cross-correlation calculation; and
determine whether the received vehicle control signal is normal based on the times of arrival.

2. The vehicle of claim 1, wherein the processor is configured to:
determine whether the vehicle control signal is normal based on consistency for distribution locations of the times of arrival in the results of performing the cross-correlation calculation.

3. The vehicle of claim 1, wherein the processor is configured to:
determine a maximum peak on a frequency graph corresponding to the results of performing the cross-correlation calculation in conjunction with extracting the times of arrival, calculate peak candidates located within a certain length from the maximum peak, and calculate a furthest peak from the maximum peak among the calculated peak candidates as the time of arrival.

4. The vehicle of claim 1, wherein the processor is configured to:
calculate an offset accumulation value for a difference between distribution locations of the times of arrival and determine the vehicle control signal as an attack signal corresponding to an abnormal signal when the offset accumulation value is greater than a predefined parameter value.

5. The vehicle of claim 4, wherein the processor is configured to:

invalidate the received vehicle control signal, when the vehicle control signal is the abnormal signal.

6. The vehicle of claim 4, wherein the processor is configured to:

transmit at least one of a time when the vehicle control signal is received, the number of times that the vehicle control signal is received, or a location where the vehicle control signal is received to a predefined device, when the vehicle control signal is the abnormal signal.

7. The vehicle of claim 1, wherein the processor is configured to:

calculate an offset accumulation value for a difference between distribution locations of the times of arrival and determine the vehicle control signal as a normal signal when the accumulated offset less is less than or equal to a predefined parameter value.

8. The vehicle of claim 7, wherein the processor is configured to:

unlock a door lock of the vehicle, turn on the vehicle, or turn on an air circulation device of the vehicle in response to the received vehicle control signal, when the vehicle control signal is the normal signal.

9. A method comprising:

receiving, by a processor, a vehicle control signal through an antenna device of a vehicle;

extracting, by the processor, a scrambled timestamp sequence (STS) field in the vehicle control signal;

dividing, by the processor, the extracted STS field into sub-fields, each of which has a predefined certain length;

dividing, by the processor, a local template previously stored in a storage into a plurality of sub-templates in response to the lengths of the divided sub-fields;

performing, by the processor, a cross-correlation calculation of the sub-fields divided from the extracted STS field and the plurality of sub-templates divided from the local template;

extracting, by the processor, times of arrival of the vehicle control signal from the results of performing the cross-correlation calculation;

determining, by the processor, whether the received vehicle control signal is normal based on the times of arrival; and controlling, by the processor, to unlock a door lock of the vehicle, turn on the vehicle, or turn on an air circulation device of the vehicle in response to the received vehicle control signal, when the vehicle control signal is normal.

10. The method of claim 9, wherein determining whether the received vehicle control signal is normal includes:

determining whether the vehicle control signal is normal based on consistency for distribution locations of the times of arrival in the results of performing the cross-correlation calculation.

11. The method of claim 9, wherein extracting the times of arrival includes:

determining a maximum peak on a frequency graph corresponding to the results of performing the cross-correlation calculation;

calculating peak candidates located within a certain length from the maximum peak; and calculating a furthest peak from the maximum peak among the calculated peak candidates as the time of arrival.

12. The method of claim 9, wherein determining whether the received vehicle control signal is normal includes:

calculating an offset accumulation value for a difference between distribution locations of the times of arrival; and determining the vehicle control signal as an attack signal corresponding to an abnormal signal, when the offset accumulation value is greater than a predefined parameter value.

13. The method of claim 12, further comprising:

invalidating the received vehicle control signal, when the vehicle control signal is the abnormal signal.

14. The method of claim 12, further comprising:

transmitting at least one of a time when the vehicle control signal is received, the number of times that the vehicle control signal is received, or a location where the vehicle control signal is received to a predefined device, when the vehicle control signal is the abnormal signal.

15. The method of claim 9, wherein determining whether the received vehicle control signal is normal includes:

calculating an offset accumulation value for a difference between distribution locations of the times of arrival; and determining the vehicle control signal as a normal signal, when the accumulated less is less than or equal to a predefined parameter value.

16. A non-transitory computer readable medium containing program instructions executed by a processor, the computer readable medium comprising:

program instructions that receive a vehicle control signal through an antenna device of a vehicle;

program instructions that extract a scrambled timestamp sequence (STS) field in the vehicle control signal;

program instructions that divide the extracted STS field into sub-fields, each of which has a predefined certain length;

program instructions that divide a local template previously stored in a storage into a plurality of sub-templates in response to the lengths of the divided sub-fields;

program instructions that perform a cross-correlation calculation of the sub-fields divided from the extracted STS field and the plurality of sub-templates divided from the local template;

program instructions that extract times of arrival of the vehicle control signal from the results of performing the cross-correlation calculation;

program instructions that determine the vehicle control signal as a normal signal when consistency of distribution locations of the times of arrival in the results of performing the cross-correlation calculation is greater than or equal to a predefined reference value and determine the vehicle control signal as an abnormal signal when the consistency is less than the predefined reference value;

program instructions that invalidate the received vehicle control signal, when the vehicle control signal is the abnormal signal; and program instructions that control to unlock a door lock of the vehicle, turn on the vehicle, or turn on an air circulation device of the vehicle in response to the received vehicle control signal, when the vehicle control signal is the normal signal.

* * * * *